(12) United States Patent
Zhou et al.

(10) Patent No.: US 12,057,623 B2
(45) Date of Patent: Aug. 6, 2024

(54) ANTENNA DESIGN AND MANUFACTURING FOR SMART GLASSES ANTENNAS

(71) Applicant: Microsoft Technology Licensing, LLC, Redmond, WA (US)

(72) Inventors: Yijun Zhou, Mountain View, CA (US); Robert Joseph Hill, Medford, OR (US); Qingxiang Li, Cupertino, CA (US); Heesuk Chung, San Jose, CA (US); Daejoung Kim, Sunnyvale, CA (US); Venkata Vishnu Gurukula, Mountain House, CA (US); Mohit Narang, Cupertino, CA (US); Rubén Caballero, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 398 days.

(21) Appl. No.: 17/393,400

(22) Filed: Aug. 3, 2021

(65) Prior Publication Data

US 2023/0041962 A1 Feb. 9, 2023

(51) Int. Cl.
*H01Q 1/27* (2006.01)
*G02B 27/01* (2006.01)
(Continued)

(52) U.S. Cl.
CPC ......... *H01Q 1/273* (2013.01); *G02B 27/0176* (2013.01); *G02C 5/001* (2013.01);
(Continued)

(58) Field of Classification Search
CPC .......... H01Q 1/273; H01Q 5/371; H01Q 9/30; H01Q 21/28; H01Q 9/42; G02B 27/0176;
(Continued)

(56) References Cited

U.S. PATENT DOCUMENTS

2015/0109174 A1* 4/2015 Chang ...................... H01Q 9/42
343/718
2018/0212314 A1* 7/2018 Rautio ...................... G02C 5/22

FOREIGN PATENT DOCUMENTS

KR 20160071572 A 6/2016
KR 102026796 B1 * 9/2019
KR 102026796 B1 9/2019

OTHER PUBLICATIONS

"International Search Report and Written Opinion Issued in PCT Application No. PCT/US22/032414", Mailed Date: Sep. 28, 2022, 12 Pages.

* cited by examiner

*Primary Examiner* — Wyatt A Stoffa
*Assistant Examiner* — Ray Alexander Dean
(74) *Attorney, Agent, or Firm* — Alleman Hall & Tuttle LLP

(57) ABSTRACT

Metallic, electrically conductive, structures on smart glasses, which can be utilized to provide structural integrity and/or thermal dissipation capability, can be leveraged to provide antenna capability as well. Metallic structures on smart glasses are utilized as antenna grounds, with corresponding antenna elements being electrically coupled thereto, and located on the glasses temple. Such antenna elements implement folded antennas having an antenna length selected in accordance with desired communicational frequencies. A shorting pin establishes the electrical connection to the antenna ground. Metallic structures on smart glasses are also utilized as antenna elements, with different metallic structures acting as the antenna ground. Such antenna elements implement monopole antennas having a length selected in accordance with desired communicational frequencies, and a width that can maintain structural integrity and/or thermal dissipation capability. Multiple antenna (Continued)

elements are manufactured onto a single glasses temple, and both temples of the smart glasses comprise antennas.

18 Claims, 9 Drawing Sheets

(51) Int. Cl.
*G02C 5/00* (2006.01)
*G02C 5/14* (2006.01)
*G02C 11/00* (2006.01)
*G06F 1/16* (2006.01)
*H01Q 5/371* (2015.01)
*H01Q 9/30* (2006.01)

(52) U.S. Cl.
CPC ............... *G02C 5/14* (2013.01); *G02C 11/10* (2013.01); *G06F 1/163* (2013.01); *H01Q 5/371* (2015.01); *H01Q 9/30* (2013.01); *G02B 2027/0178* (2013.01)

(58) Field of Classification Search
CPC .. G02B 2027/0178; G02C 5/001; G02C 5/14; G02C 11/10; G06F 1/163
See application file for complete search history.

ANTENNA DESIGN AND MANUFACTURING FOR SMART GLASSES ANTENNAS

BACKGROUND

As portable computing devices, such as smart phones, tablets, and laptops, have become ubiquitous, there is a greater desire for other types of computing devices that can even more seamlessly integrated with daily life. One such portable computing device can be smart glasses, which can be eyewear that can comprise computing functionality, including computer-driven display capability. Often such smart glasses will comprise various types of displays that can project images onto the lenses of the smart glasses, or which can otherwise display images to the user while still allowing the user to visually perceive through the lenses of the smart glasses. Such display capability can implemented by hardware that can required more robust support structures than traditional eyewear. Additionally, the display hardware and/or processing hardware can generate heat, which can necessitate that smart glasses provide mechanisms of thermal dissipation.

One solution to address both the mechanical support and thermal dissipation required by smart glasses hardware, including processing hardware and/or display hardware, can be to construct at least some portion of the smart glasses from a metal that can provide both structural integrity and thermal dissipation capability. Unfortunately, such metal is often utilized on the smart glasses temples and/or frames, which negatively impacts the placement of antennas for the transmission and reception of wireless signals. Because wired connectivity is impractical for smart glasses, it is important for the smart glasses to be able to communicate wirelessly, including communicating wirelessly across many different radio frequencies and wavelengths, and including communicating utilizing both short range and long range wireless data communications. Such communications can require multiple antennas, which can exacerbate the antenna placement problem given the limited space available on smart glasses, and given the further space limitations introduced by the utilization of metal on portions of the smart glasses to provide structural integrity and/or thermal dissipation capability.

SUMMARY

Metallic, electrically conductive, structures on smart glasses, which can be utilized to provide structural integrity and/or thermal dissipation capability, can be leveraged to provide antenna capability as well. Metallic structures on smart glasses can be utilized as antenna grounds, with corresponding antenna elements being electrically coupled thereto, and located on the glasses temple. Such antenna elements can implement folded antennas having an antenna length that can be selected in accordance with the frequencies of the communicational signals that are to be sent and received through such antenna elements. A shorting pin can establish the electrical connection to the antenna ground. Metallic structures on smart glasses can also be utilized as antenna elements, with different metallic structures acting as the antenna ground. Such antenna elements can implement monopole antennas having a length that can be selected in accordance with the frequencies of the communicational signals that are to be sent and received through such antenna elements, and having a width that can maintain structural integrity and/or thermal dissipation capability. Multiple antenna elements can be manufactured onto a single glasses temple, and both temples of the smart glasses can comprise antennas.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

The following description relates to the utilization and/or leveraging of metallic electrically conductive, structures on smart glasses to provide, not only structural integrity and/or thermal dissipation capability, but also provide antenna capability as well. Metallic structures on smart glasses can be utilized as antenna grounds, with corresponding antenna elements being electrically coupled thereto, and located on the glasses temple. Such antenna elements can implement folded antennas having an antenna length that can be selected in accordance with the frequencies of the communicational signals that are to be sent and received through such antenna elements. A shorting pin can establish the electrical connection to the antenna ground. Metallic structures on smart glasses can also be utilized as antenna elements, with different metallic structures acting as the antenna ground. Such antenna elements can implement monopole antennas having a length that can be selected in accordance with the frequencies of the communicational signals that are to be sent and received through such antenna elements, and having a width that can maintain structural integrity and/or thermal dissipation capability. Multiple antenna elements can be manufactured onto a single glasses temple, and both temples of the smart glasses can comprise antennas.

Figure 1:
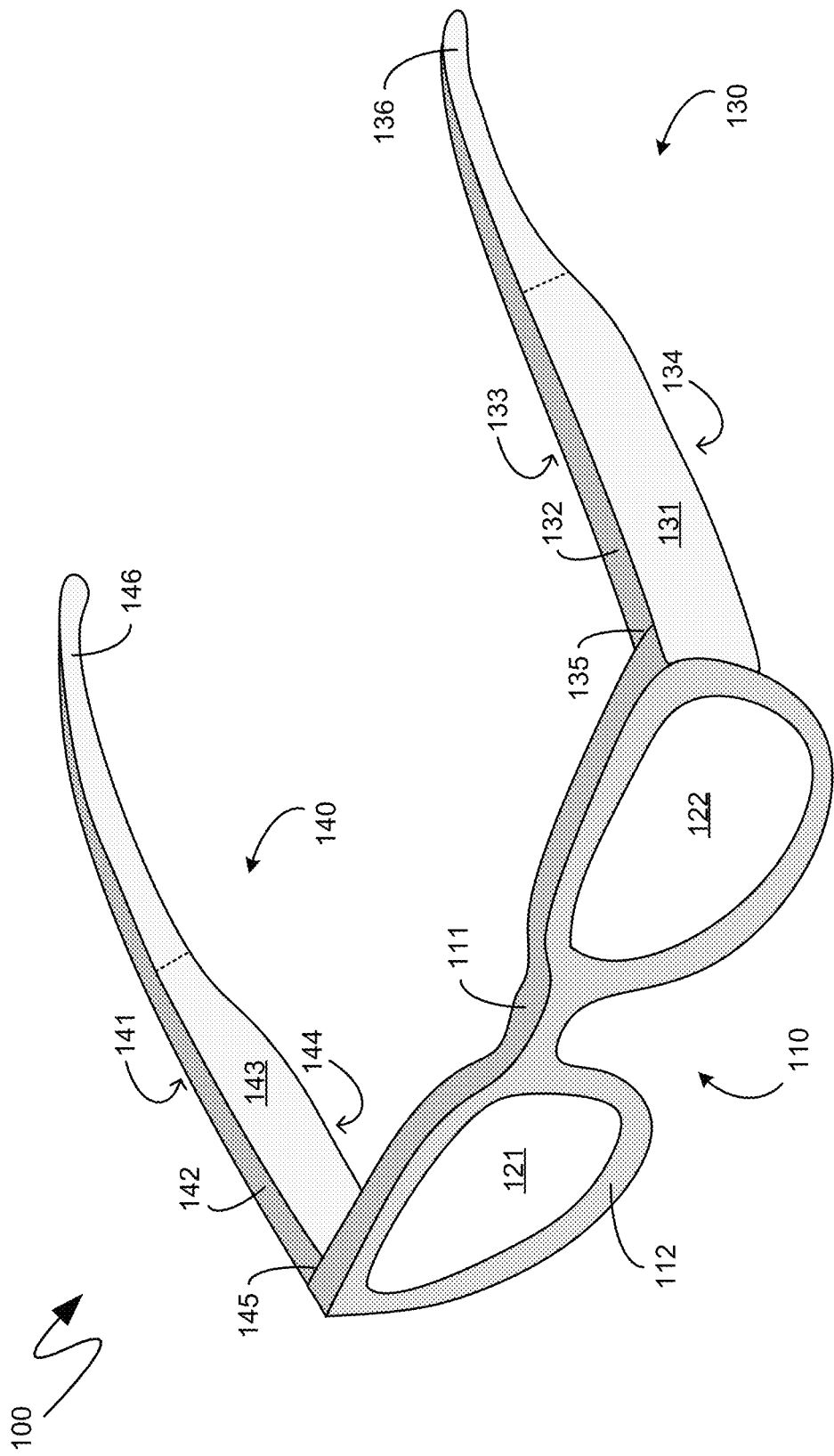
FIG. 1 is a diagram of an exemplary eyeglasses.

With reference to FIG. 1, exemplary eyeglasses 100 are illustrated, providing context for the descriptions below. The exemplary eyeglasses 100 can be smart glasses which can provide computer processing and/or computer display capability. The exemplary eyeglasses can comprise an eyeglasses frame, such as the exemplary eyeglasses frame 110, and one or more eyeglasses temples, such as the exemplary eyeglasses temples 130 and 140. The exemplary eyeglasses frame 110 can comprise a bridge, such as the exemplary bridge 111, as well as rims, such as exemplary rims 112. The exemplary eyeglasses 100 can further comprise lenses, such as the exemplary lenses 121 and 122.

Each of the temples, such as the exemplary temples 130 and 140, can comprise various sides including the top of such temples, 132 and 142, respectively, and bottoms 134 and 144, respectively. Additionally, each temple can comprise an inward-facing side that can be adjacent to a head of a user wearing the eyeglasses 100, and an outward-facing side that can be opposite the inward-facing side. Exemplary temple 140 is shown as comprising an inward-facing side 143 and an outward-facing side 141, and the exemplary temple 130 is shown as comprising an outward-facing side 131, and an inward-facing side 133. The exemplary temples 130 and 140 can terminate in temple tips, such as exemplary temple tips 136 and 146, respectively.

The computer processing hardware that can provide the computer processing capability of the smart glasses can be installed on various portions of the exemplary eyeglasses 100, including one or more of the frame 110 and/or one or more of the temples 130 and 140. Likewise, the display hardware that can provide to the computer-generated display capabilities of the smart glasses can be installed on various portions of the exemplary eyeglasses 100 including one or more of the frame 110 and/or one or more of the temples 130 and 140, and can generate images that can be perceived by the user through one or more of the lenses 121 and/or 122. Such computer processing hardware and/or display hardware can require that the glasses provide structural stability and integrity to support such computer processing hardware and/or display hardware. Moreover, such computer processing hardware and/or display hardware can generate heat, which may need to be dissipated by the glasses, thereby requiring that the glasses provide thermal dissipation. One mechanism by which smart glasses can provide structural stability and integrity and/or thermal dissipation can be through the utilization of metallic materials for at least portions of the frame 110 and/or one or more of the temples 130 and 140. As will be detailed below, such metallic materials can further be utilized as antenna grounds and/or antenna elements to enable the integration of antennas onto the structure of the glasses 100.

Figure 2:
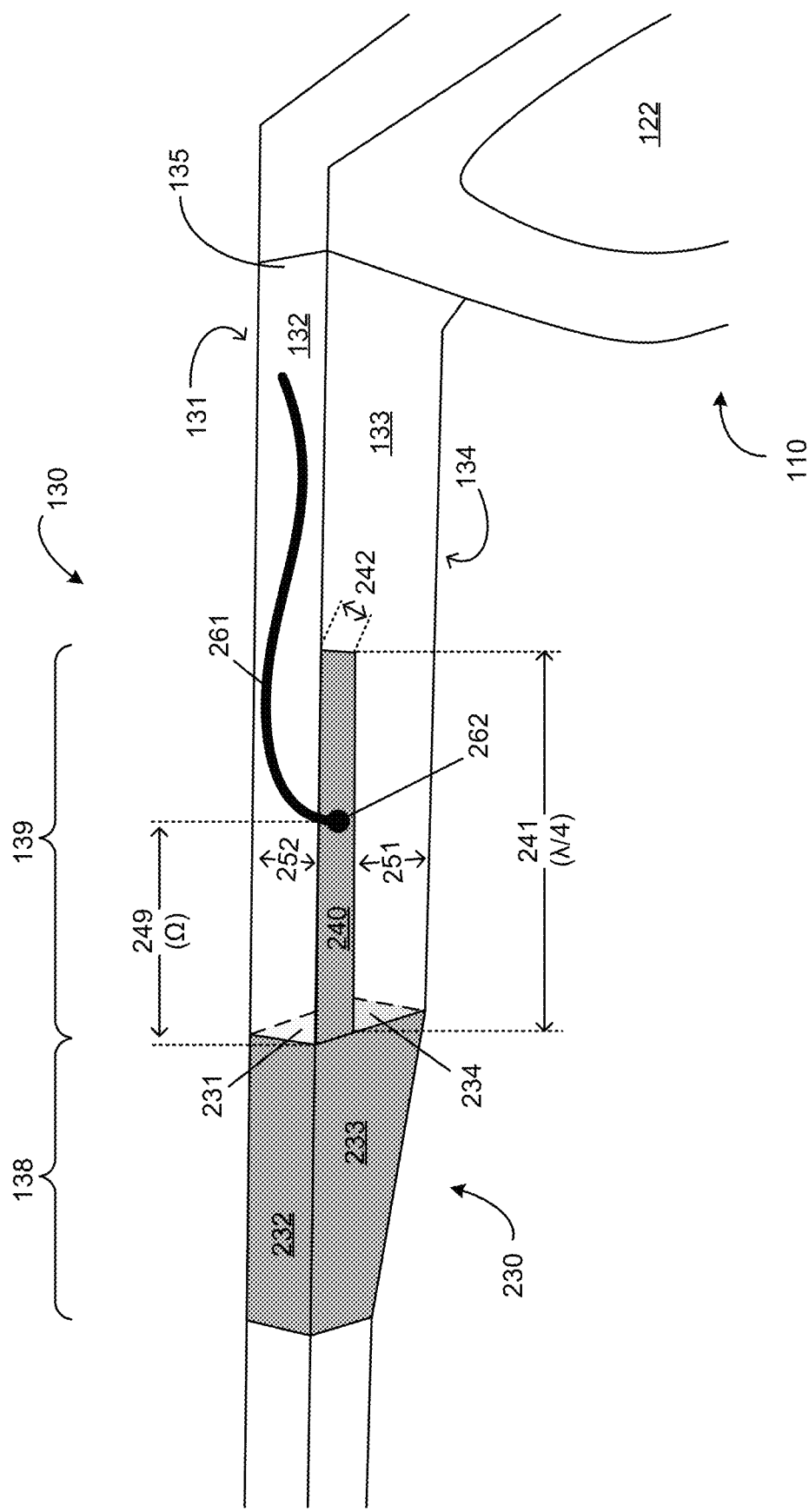
FIG. 2 is a diagram of an exemplary eyeglasses temple with antenna functionality.

Turning to FIG. 2, the eyeglasses temple 130 is illustrated from a different perspective, with the eyeglasses frame 110 and the lens 122 shown to provide context for the illustrated perspective. As before, the eyeglasses temple 130 is shown as comprising an inward-facing side 133 and an outward-facing side 131, as well as a bottom side 134 and a top side 132. One end 135 of the temple 130 can be proximate to the eyeglasses and can enable the connection of the temple 132 the eyeglasses. The opposite end of the temple 130, namely the temple 136, is not shown in FIG. 2. As indicated above, to provide structural stability and integrity and/or thermal dissipation at least some portion of the temple 130 can be made of metal. According to one aspect, the metal can be overlaid over an underlying substrate that can be made of a lighter weight material and can provide a shape of the temple 130, while the overlaid metal can provide for the provide structural stability and integrity and/or thermal dissipation.

Figure 4A:
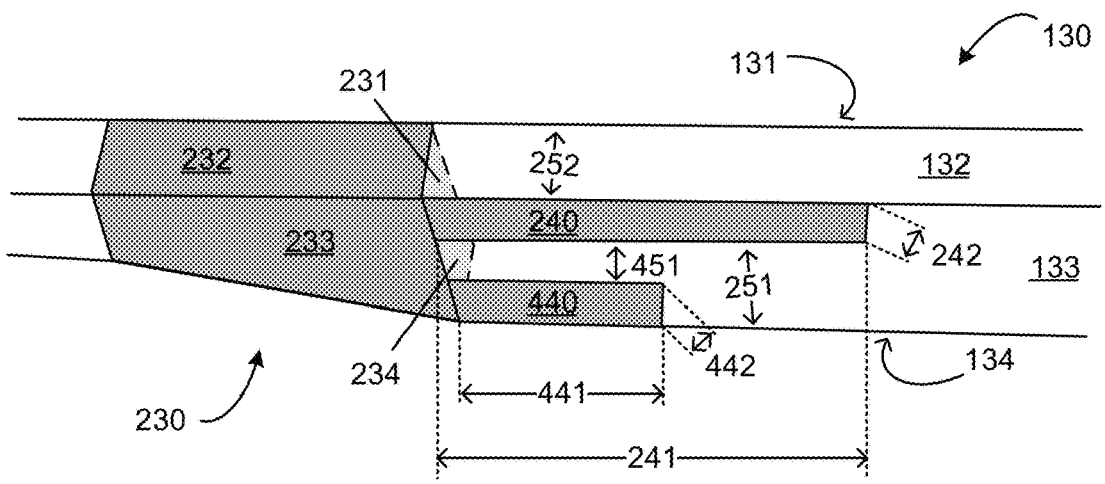
FIGS. 4a-c are diagrams of an exemplary eyeglasses temple with antenna functionality having different antenna elements.
Figure 4B:
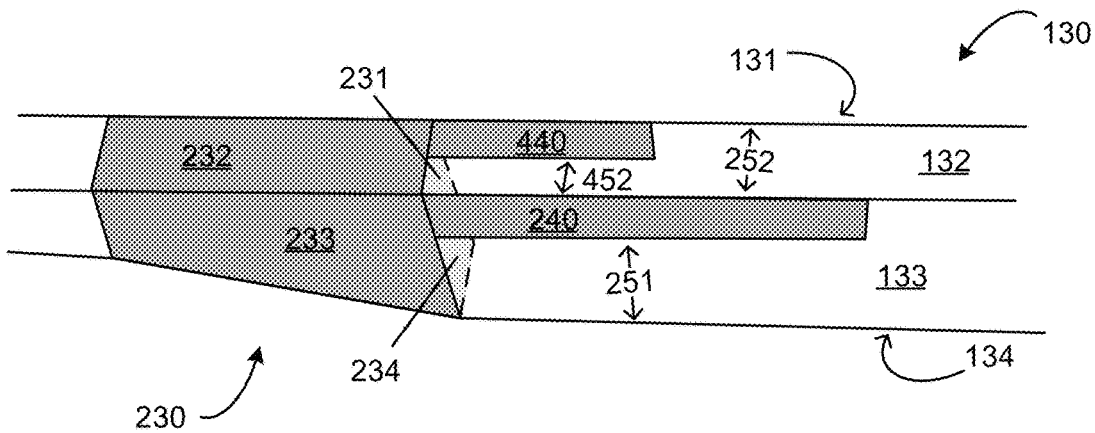
Figure 4C:
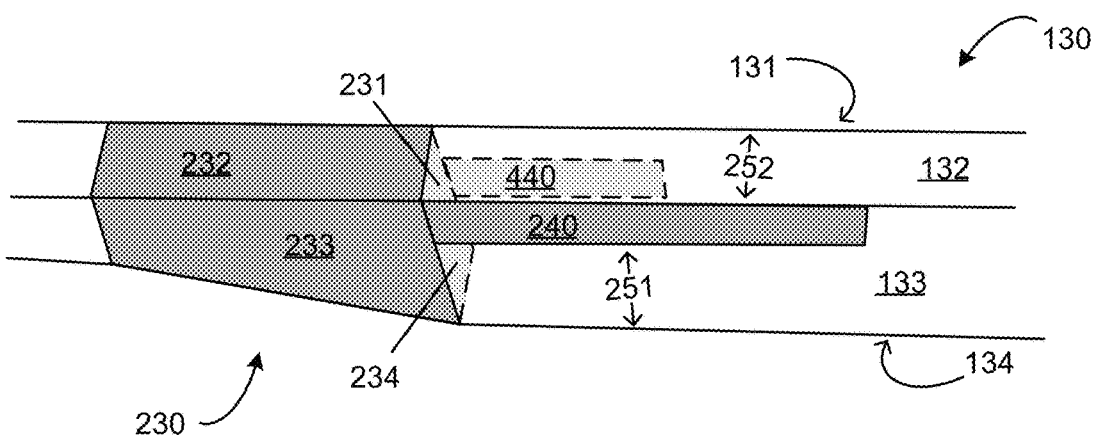
Figure 5A:
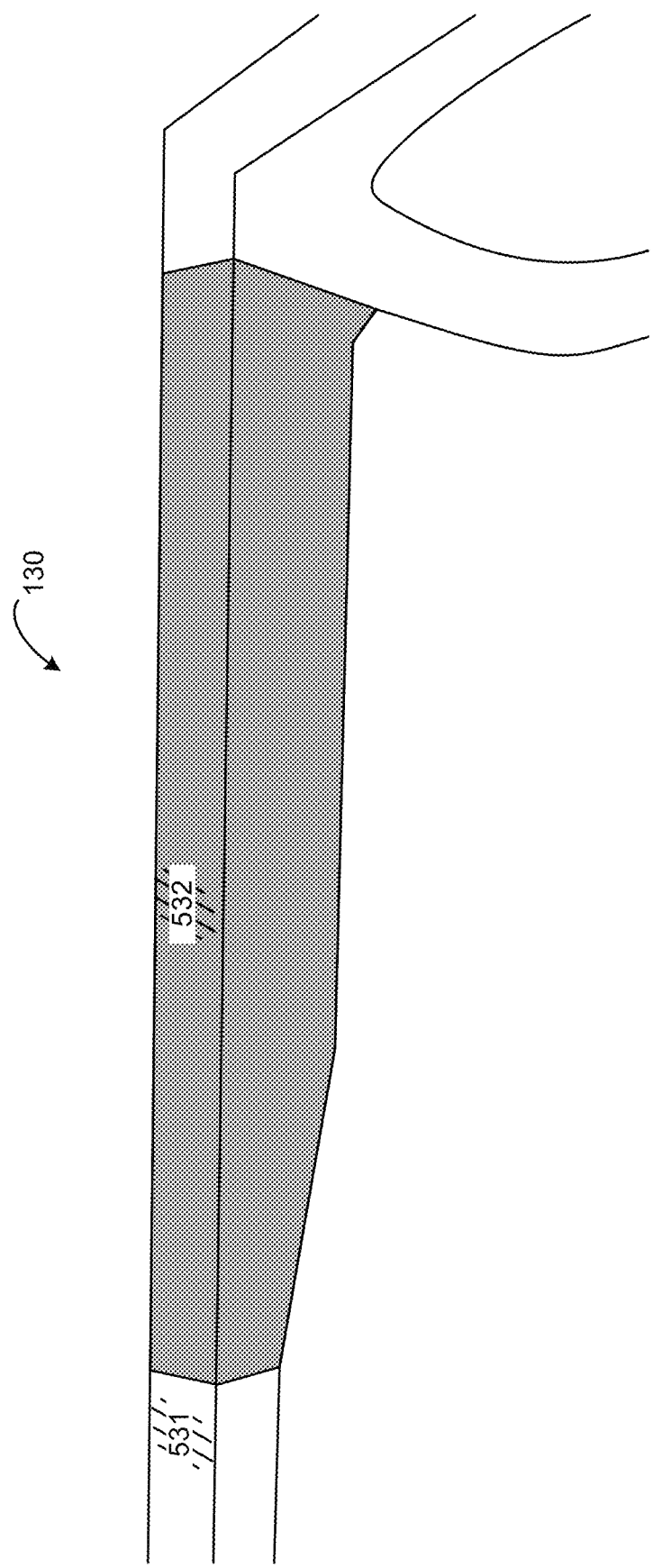
FIGS. 5a-c are diagrams of an exemplary manufacturing of an eyeglasses temple with antenna functionality.

Turning briefly to FIG. 5*a*, the exemplary temple 130 is illustrated as comprising an underlying substrate 531, with metal 532 being overlaid over such a substrate. The underlying substrate 531 can be electrically insulating, inert, or otherwise providing little or no electrical conductance, as compared with the metal 532. For example, the underlying substrate 531 can be a plastic, or other type of polymer, wood, or other natural fiber, or other like electrically insulative materials. By contrast, the overlaid metal 532 can be electrically conductive such that the metal 532 has a low electrical resistance and/or impedance. For example, the metal 532 can be copper, silver, steel, aluminum or other like electrically conductive material. In FIGS. 2-6*b*, gray shading is utilized to illustrate portions of metal overlay, while white is utilized to illustrate portions of underlying substrate.

Turning back to FIG. 2, a metallic overlay 230 is shown as overlaying the substrate of the temple 130 along the region 138 of the temple 130. For example, the metallic overlay 230 can encircle the underlying substrate such that the metallic overlay 230 can have a portion 233 thereof overlaying an inward-facing side 133 of the temple 130, another portion 232 overlaying a top side 132 of the temple 130, another portion 234 overlaying a bottom side 134 of the temple 130, and completing the encircling, a portion 231 overlaying an outward facing side 131 of the temple 130. Other portions of the temple 130, except as detailed below, can further comprise metallic overlays, including metallic overlays that can encircle the underlying substrate. Although metallic overlays can provide structural stability and/or thermal dissipation even when not encircling the underlying substrate, including aspects that will be detailed further below, such structural stability and/or thermal dissipation can be greater when the metallic overlay encircles the underlying substrate.

According to one aspect, the metallic overlay 230 can act as an antenna ground for an antenna having an antenna element that can also be a metallic overlay along the temple 130. For example, as illustrated in FIG. 2, a metallic overlay 240 can extend along a region 139 of the temple 130, with the region 138 and 139 being adjacent to one another such that the metallic overlay 240 contacts the metallic overlay 230, such as in the manner illustrated. The metallic overlay 240 can have a length 241 and a width 242. Encircling the metallic overlay 240 can be exposed portions of the insulating substrate, such as the portions 251 and 252. The metallic overlay 240 can thus extend away from the metallic overlay 230 and can be encircled by the insulating substrate, which can be exposed on both sides of the metallic overlay 240 that are adjacent to the side of the metallic overlay 240 at which the metallic overlay 240 contact the metallic overlay 230. In addition, the insulating substrate can be exposed on the side of the metallic overlay 240 that is opposite the cited which the metallic overlay 240 contacts metallic overlay 230. In such a manner, the metallic overlay 240 can be encircled by the insulating substrate, with the exception of the side of the metallic overlay 240 at which it is connected to the metallic overlay 230.

The metallic overlay 240, along the region 139, can act as an antenna element, with the metallic overlay 230, extending along the region 138, acting as the antenna ground. For example, the metallic overlay 240 can act as a monopole antenna. In such an example, the length 241 of the metallic overlay 240 can be selected to be a quarter wavelength long. As will be recognized by those skilled in the art of antenna design and utilization, a quarter wavelength inverted monopole antenna with short pin can be communicationally coupled to circuitry that can further tune the antenna to facilitate transmission and receipt of wireless signals across a range of wavelengths around a resonant wavelength, with the resonant wavelength informing the length of the monopole antenna. As another example, the metallic overlay 240 can act as a dipole antenna. As will be recognized by those skilled in the art of antenna design and utilization, a dipole antenna can have a length twice that of a monopole antenna for the same resonant wavelength. Wireless communications such as WiFi often utilize frequencies around 2.4 GHz and/or 5 Ghz. For 5 GHz, a monopole antenna may be approximately 15 millimeters in length, while a dipole antenna may be approximately 30 millimeters in length. For 2.4 GHz, a monopole antenna may be approximately 30 millimeters in length, while a dipole antenna may be approximately 60 millimeters in length. Given the sizing of most eyeglasses, monopole antennas may be more easily integrated into an eyeglasses temple, such as the exemplary temple 130.

The width 242 of the exemplary metallic overlay 240 can have less of an effect on the utilization of the metallic overlay 240 as an antenna element. One constraint on the width 242 can be that the quantity of insulating substrate exposed on either side of the metallic overlay 240, such as the areas 251 and 252, may have an impact on the utilization of the metallic overlay 240 as an antenna element. More specifically, in some instances, a greater quantity of space in the areas 251 and 252 within which the insulating substrate is exposed, may improve the ability of the metallic overlay 242 be utilized as an antenna element. The width 242 of the metallic overlay 240 may be sized accordingly.

To utilize the metallic overlay 240 as an antenna element, a cable, such as the exemplary cable 261, or other like signal carrying element, can be communicationally coupled to the metallic overlay 240 at an electrical connection, such as the exemplary electrical connection 262. The exemplary electrical connection 262 can be a solder joint, a pin, a receptacle, or other like electrical connection. According to one aspect, as will be recognized by those skilled in the art of antenna design and utilization, an impedance of the antenna can be based on the distance 249 between the electrical connection 262 and the edge of the metallic overlay 240 at which the metallic overlay 240 electrically contacts the metallic overlay 230 that acts as the antenna ground. Accordingly, the location of the electrical connection 262, along the metallic overlay 240, may be adjusted in accordance with the desired transmission and reception capabilities of the antenna.

Figure 3A:
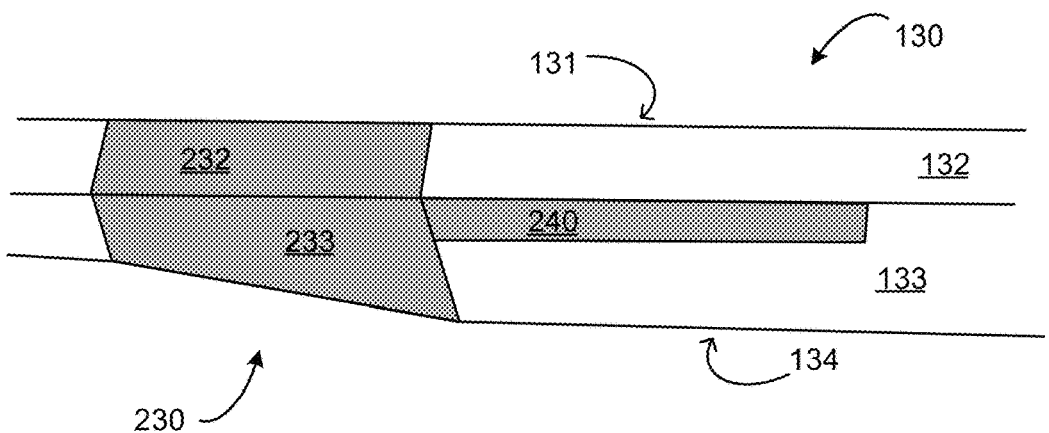
FIGS. 3a-c are diagrams of an exemplary eyeglasses temple with antenna functionality having different antenna grounds.
Figure 3B:
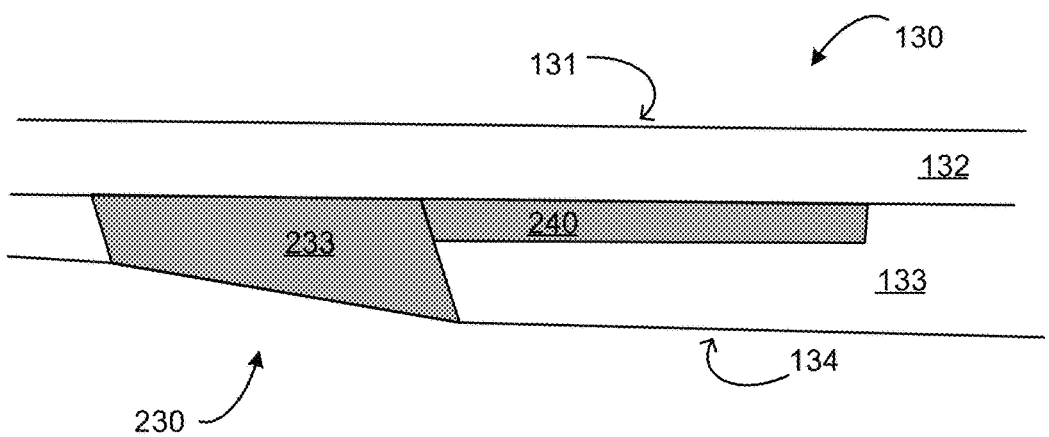
Figure 3C:
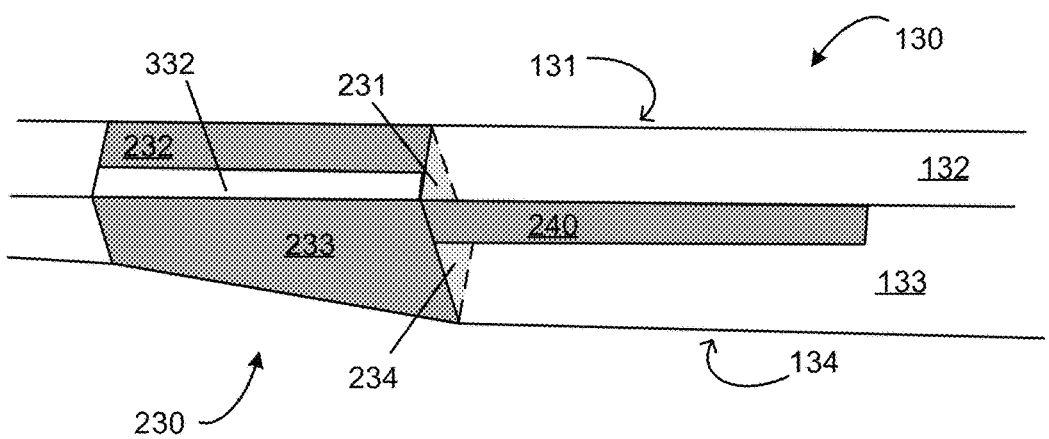

Returning to the metallic overlay 230, acting as an antenna ground, it may not be necessary, for purposes of acting as an antenna ground, for the metallic overlay 230 to encircle the underlying substrate, such as in the manner illustrated in FIG. 2. For example, as illustrated in FIG. 3a, the metallic overlay 230 can extend across only two sides of the temple 130, such as the metallic overlay portion 232 extending across the top side 132 of the temple 130, and the metallic overlay portion 233 extending across the inward-facing side 133 of the temple 130. In such an instance, other sides of the temple, such as the exemplary bottom side 134, and outward-facing side 131, can have no portion of the metallic overlay 230. As another example, illustrated in FIG. 3b, the metallic overlay 230 can extend across only one side of the temple 130, such as the metallic overlay portion 233 extending across the inward-facing side 133 of the temple 130. In such an instance, other sides of the temple, such as the exemplary top-side 132, bottom side 134, and outward-facing side 131, can have no portion of the metallic overlay 230. As yet another example, illustrated in FIG. 3c, the metallic overlay 230 can encircle most, but not all of the underlying substrate. For example, a gap 332 can expose some of the underlying substrate on one side, such as the top side 132, while the metallic overlay 230 extends fully across the remaining sides.

Additionally, the metallic overlay 230 may act as an antenna ground for multiple antenna elements. For example, as illustrated in FIG. 4a, the aforementioned metallic overlay 240 can act as one antenna element, while a second metallic overlay, such as the exemplary metallic overlay 440, can act as a second antenna element. More specifically, and as illustrated, the metallic overlay 440 may be spaced apart from the metallic overlay 240, such that some of the insulating substrate, namely the portion 451 of the insulating substrate, can be exposed. As indicated previously, the functionality of a metallic overlay as an antenna element can be impacted by a quantity of space of the insulating substrate exposed around it. Thus, for example, as illustrated in FIG. 4a, the metallic overlay 440 can be positioned on a same side of the temple 130, namely the inward-facing side 133, as the metallic overlay 240, except that the metallic overlay 440 can be positioned such that the area 451 is as great as possible. As also indicated previously, a width 442 of the metallic overlay 440 can have a minimal impact on the utilization of the metallic overlay 440 as an antenna element. Accordingly, the width 442 of the metallic overlay 440, the width 242 of the metallic overlay 240, or combinations thereof, can be selected so as to increase the area 451.

According to one aspect, multiple metallic overlays can have different lengths so that antennas utilizing such metallic overlays as antenna elements can have different resonant frequencies, or can otherwise be tuned to different frequencies and/or frequency ranges. For example, as illustrated in FIG. 4a, the exemplary metallic overlay 440 may have a length 441, that can differ from the length 241 of the metallic overlay 240. If the metallic overlay 440 is utilized as a monopole antenna element, the length 441, differing from the length 241, may result in an antenna utilizing the metallic overlay 440 as an antenna element being tuned to a different frequency than an antenna utilizing the metallic overlay 240 as an antenna element. Such a difference in length can result in the longer metallic overlay, such as the exemplary metallic overlay 240, extending past the metallic overlay 440, such that at least some portion of the metallic overlay 240 has a larger area 251 of the insulating substrate surrounding it.

To increase space between antenna elements, and thereby potentially improve their performance, multiple metallic overlays, acting as antenna elements, can be positioned on multiple different sides of the temple 130. Thus, for example, FIG. 4b illustrates the exemplary metallic overlay 440 being positioned on a top side 132 of the temple 130, while the exemplary metallic overlay 240 is positioned on an inward-facing side 133 of the temple 130. In such an instance, a space 452, such as along the top side 132 of the temple 130, can be greater than the space 451 if both antenna elements were positioned on a same side. Additionally, since one antenna element can be longer than the other, such as, for example, the metallic overlay 240 being longer than the metallic overlay 440, the metallic overlay 240 can still have the increased area 252 of the insulating substrate surrounding it. As another example, FIG. 4c illustrates the metallic overlay 440 being positioned on an opposite side, namely the outward-facing side 131 of the temple 130, from the inward facing side 133 on which the metallic overlay 240 is positioned. Such an arrangement can further increase the spacing between the antenna elements.

As indicated previously, metal portions of smart glasses temples, such as exemplary temple 130, can provide structural support and/or thermal dissipation capabilities. Accordingly, additional metallic overlay may be located in regions other than the regions 138 and 139 shown in FIG. 2, so long as the additional metallic overlay does not contact any of the three edges of the metallic overlay 240 that are not connected to the metallic overlay 230, nor similarly contact any other metallic overlay acting as an antenna element. For example, additional metallic overlay may be located near the end 135, or on the frame 110 itself, or combinations thereof.

Figure 5B:
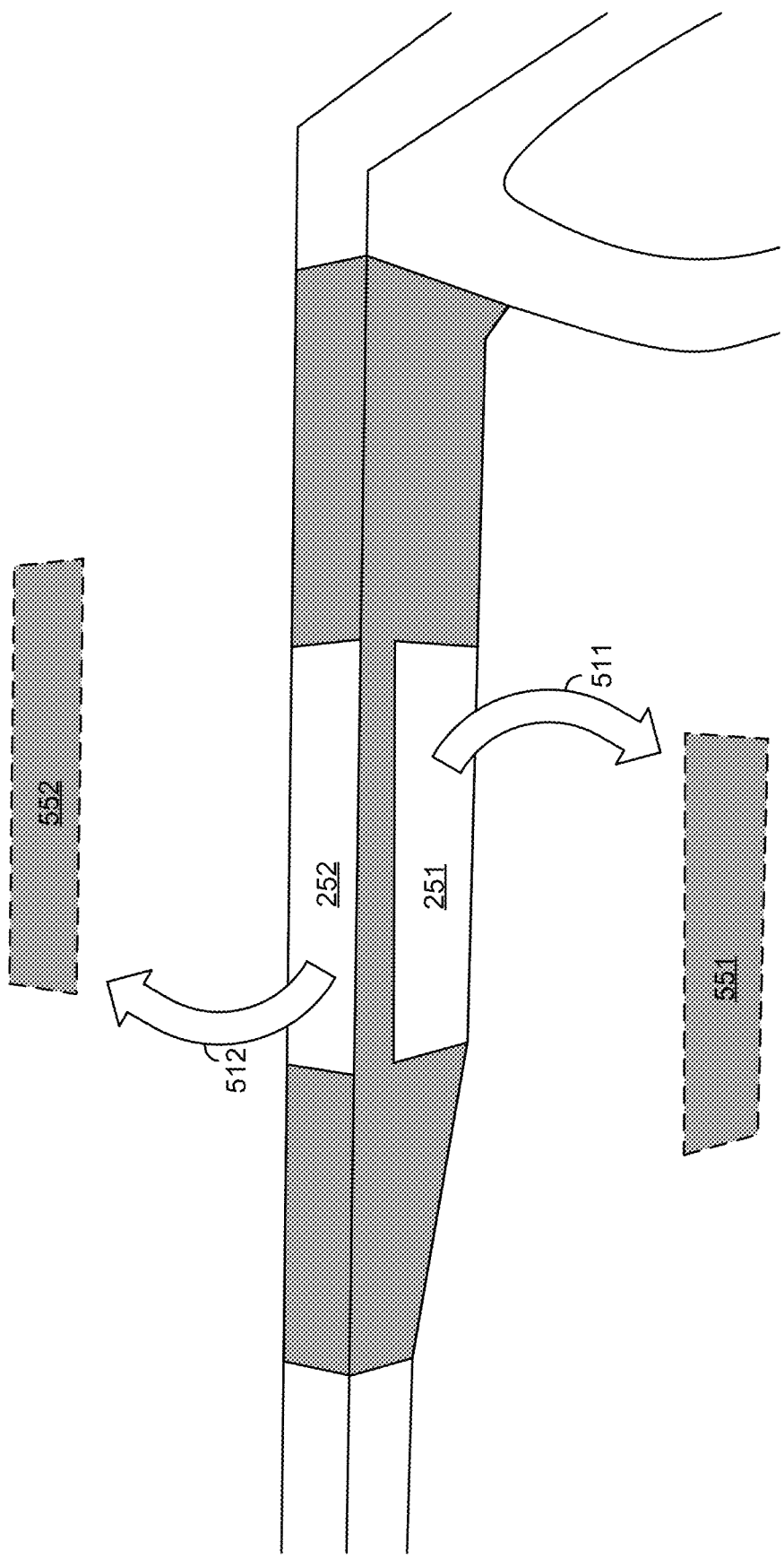
Figure 5C:
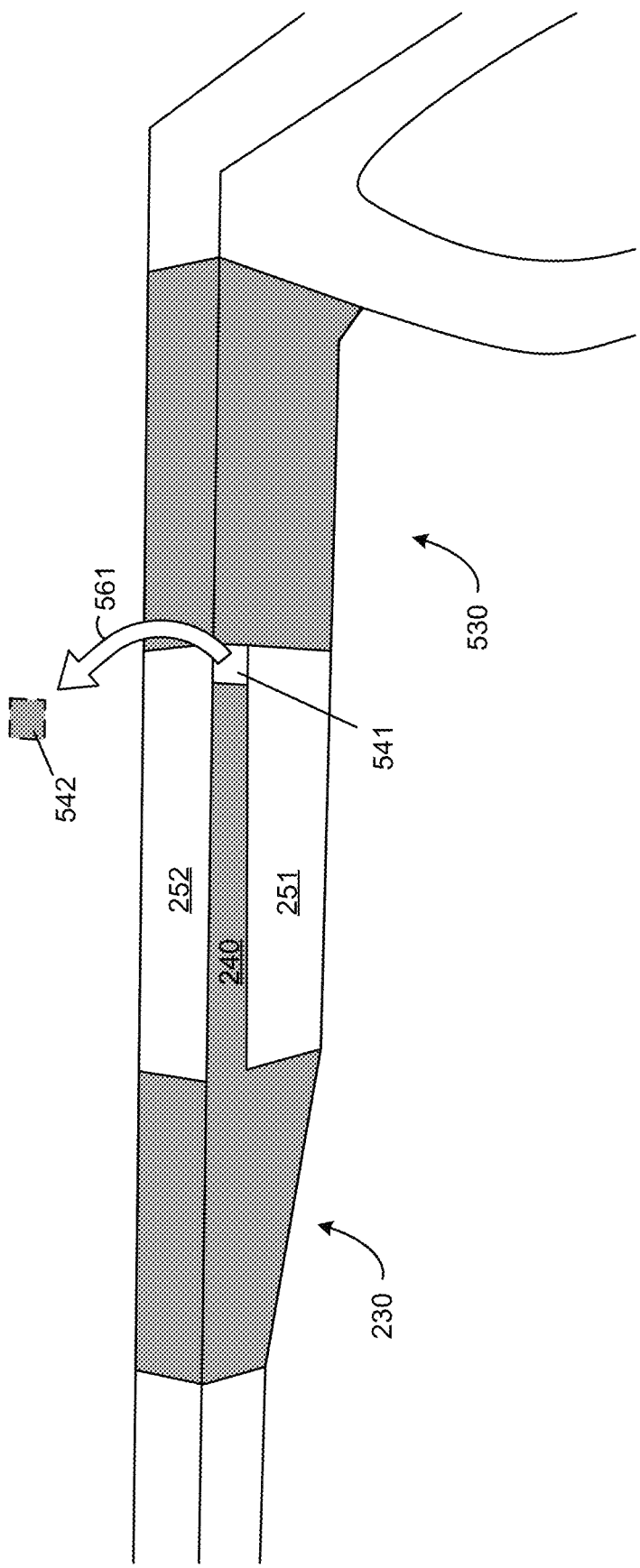

According to one aspect, most or all of the temple 130 can initially comprise a metallic overlay, with portions of the metallic overlay being removed to reveal the overlay 240 that can act as an antenna element. More specifically, and turning to FIG. 5a, the temple 130 is shown with the substrate 531 and having a metallic overlay, such as the metal 532, along a region comprising most of the length of the temple 130. Turning next to FIG. 5b, portions of the metal overlay can be removed. For example, FIG. 5b illustrates the portions 551 and 552 being removed from the metallic overlay, leaving the substrate exposed in the corresponding areas from which the portions 551 and 552 were removed, namely the areas 251 and 252, respectively. The removal 511 of the portion 551, as well as the removal 512, of the portion 552, may be performed via etching, mechanical abrasion, cutting, chemical abrasion, or other like mechanisms that can remove a metallic overlay. In an analogous manner, FIG. 5c illustrates the remaining portion being removed from the metallic overlay, namely the portion 542. The removal 561, of the portion 542, may be performed in the same manner as the removal 511 of the portion 551, and the removal 512 of the portion 552. Alternatively, the removal 561 may utilize different mechanisms, since the portion 542 can be smaller than the portions 551 and 552. As such, the removal 561 may utilize mechanisms better suited to smaller areas, such as laser cutting.

As can be seen from FIG. 5c, with the substrate now exposed in the areas 251, 252 and 561, due to the removal of the metallic overlay from those areas, the remaining metallic areas 230 and 240 are equivalent to the areas 230 and 240 shown in FIG. 2 and described in detail above. In addition to the metallic areas 230 and 240, the mechanisms shown in FIGS. 5a-c can also result in another metallic overlay area, namely the exemplary metallic overlay area 530. As indicated previously, additional metallic overlay areas, that do not otherwise meaningfully negatively impact the functioning of an antenna having an antenna ground provided by the area 230 and an antenna element provided by the area 240, such additional metallic overlay areas can provide additional structural and or thermal dissipation benefits.

Figure 6A:
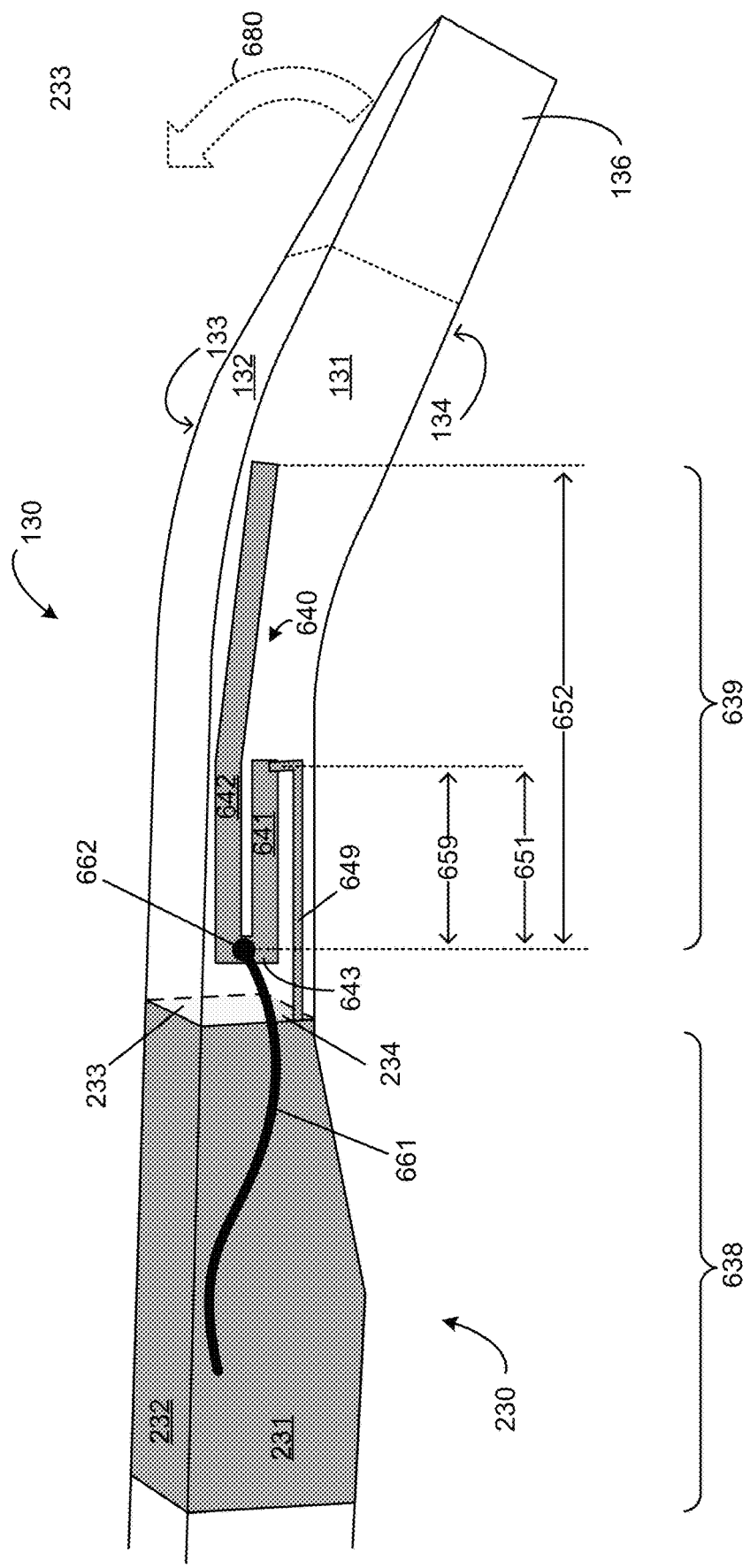
FIGS. 6a-b are diagrams of an exemplary eyeglasses temple with antenna functionality having different antenna elements.
Figure 6B:
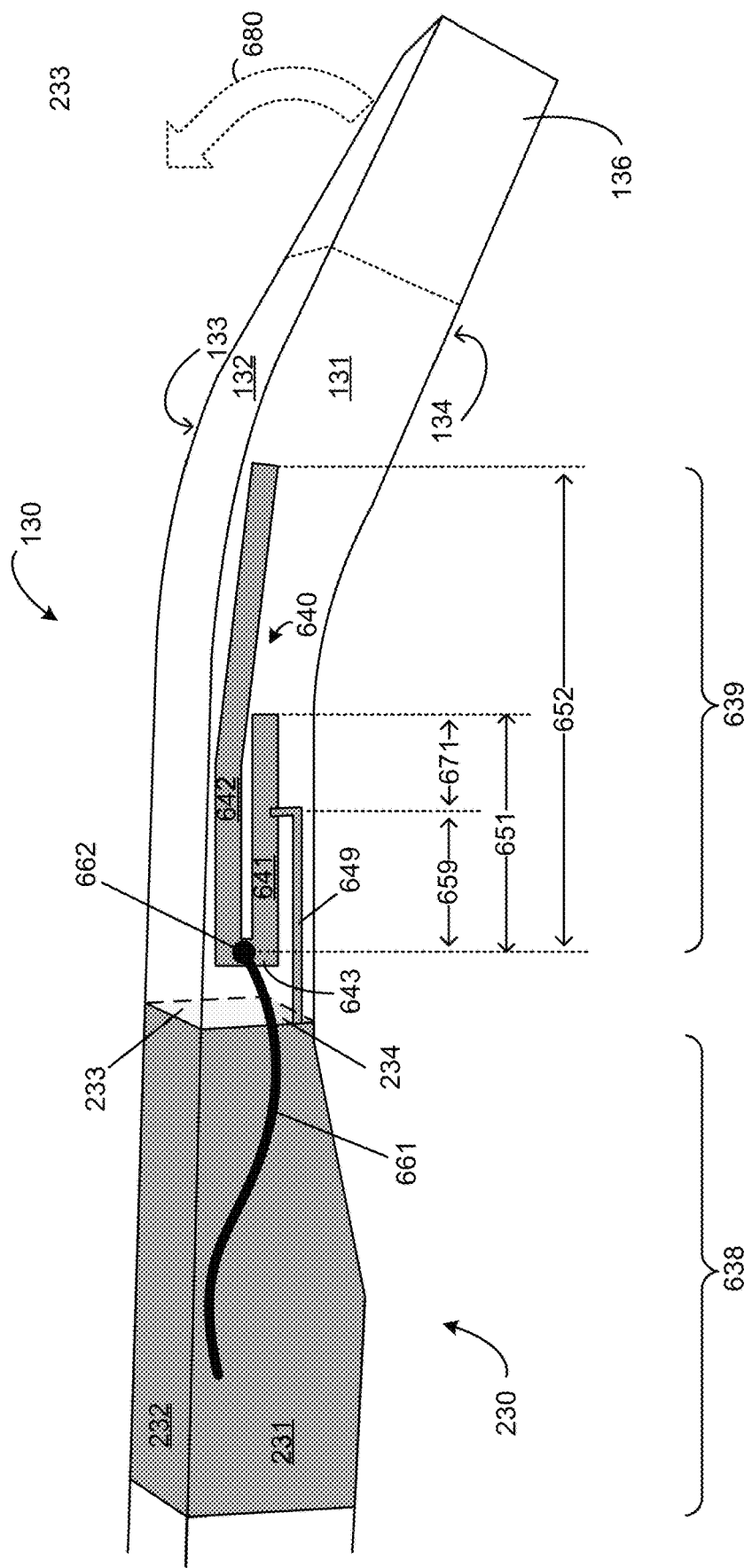

Turning to FIG. 6a, the exemplary temple 130 is shown from another perspective, namely with the inward-facing side 133 being now positioned away from the viewer of the Figure, and the outward facing side 131 being positioned facing the viewer of the Figure. As such, the metallic overlays shown in FIG. 6a can be on an opposite side from the metallic overlay area 240 illustrated previously. However, the mechanisms and structures described and illustrated by the prior figures, and the mechanisms and structures described herein and illustrated by FIGS. 6a and 6b, are equally applicable irrespective of the side of a temple on which they are mounted, constructed, or otherwise located.

Within FIG. 6a, one region of the temple 130, such as the exemplary region 638, can comprise a metallic overlay, such as the exemplary metallic overlay 230, which can be analogous to, or equivalent to, the metallic overlay 230 described previously. As such, while the exemplary metallic overlay 230 is illustrated in FIG. 6a as encircling the substrate by having four sides 231, 232, 233 and 234, respectively, in other aspects, the exemplary metallic overlay 230 can overlay the underlying substrate on one or more of the sides of the temple 130, such as was illustrated by FIGS. 3a-c.

According to one aspect, a second metallic overlay can be overlaid over the substrate of the temple 130 along a second region of the temple 130 that is not immediately adjacent to the region 638. As shown in FIG. 6a, the region 639 may be spaced apart from the region 638. Along the region 639 of the temple 130, a metallic overlay, such as the exemplary metallic overlay 640 can be manufactured. The metallic overlay 640 may be utilized as an antenna element, with the metallic overlay 230 being utilized as the antenna ground.

Some frequencies commonly utilized for wireless communication among computing devices can be substantially lower than the 2.4 GHz and 5 GHz frequencies referenced above. For example, some cellular communications may utilize frequency bands between 600 and 960 MHz for low band, and between 1710 MHz and 2700 MHz for mid/high band, and between 3300 MHz and 5000 MHz for ultra high band. Accordingly, while a quarter wavelength monopole antenna having a resonant frequency of 2.4 GHz may be approximately 30 millimeters in length, an analogous quarter wavelength monopole antenna having a resonant frequency of 600 MHz may be nearly 4 times longer, approximately 120 millimeters in length.

According to one aspect, therefore, to fit an antenna having resonant frequencies relevant for lower frequency communications, such as the above-described cellular communications, into the region 639, a metallic overlay, such as the exemplary metallic overlay 640, can provide for a folded antenna element, which can be folded with dielectric substrate loading to reduce its physical length. More specifically, and as illustrated in FIG. 6a, the metallic overlay 640 can comprise multiple portions that can be oriented in a substantially parallel manner. As utilized herein the term "substantially parallel" means that two elements are oriented alongside one another, although there may exist some angle between them caused by one element being at an angle to the other. For example, the term "substantially parallel" means that one element is at an angle to the other that is less than 45 degrees, 30 degrees, 15 degrees, or 5 degrees. Within FIG. 6a, the overlay 640 is shown as having a first part 641 that extends along at least a portion of a second part 642, with the first part 641 being spaced apart from the second part 642 so that at least some insulating substrate separates the first part 641 from the second part 642 along their length. The first part 641 and the second part 642 can be joined by a third part 643. The overlay 640 can be colloquially said to "zigzag" or have a "back and forth" shape. As a folded antenna element, parts 641 and 642, having the lengths 651 and 652, respectively, can have one or more resonant frequencies.

To utilize the metallic overlay 640 as an antenna element, a cable, such as the exemplary cable 661, or other like signal carrying element, can be communicationally coupled to the metallic overlay 640 at an electrical connection, such as the exemplary electrical connection 662. The exemplary electrical connection 662 can be a solder joint, a pin, a receptacle, or other like electrical connection. Additionally, a shorting pin, such as the exemplary shorting pin 649, can electrically couple the overlay 232 the overlay 640. More specifically, the shorting pin 649 can contact the overlay 640 at a specific location, with the distance 659 between the location 662 and the location at which the shorting pin 649 contacts the overlay 640 being a selectable distance by which an impedance of the antenna can be selected and/or adjusted. Accordingly, the location of the electrical connection 662, along the metallic overlay 640, as well as the location at which the shorting pin 649 contacts the overlay 640, can be adjusted in accordance with the desired transmission and reception capabilities of the antenna. For example, having the distance 651 and the distance 659 be commensurate with one another, such that the shorting pin 649 contacts the part 641 at the end furthest from the connection 662 can result in the part 641 not acting as an antenna element, leaving the part 642 acting as a single antenna element. In such a manner, the distance 659 can still be selected in accordance with a desired antenna impedance, but the length 651 of the part 641 may not function effectively as a separate antenna element, separate from the part 642 By contrast, having the shorting pin 649 contacting the overlay 640 at a location along the part 641 away from an end thereof can enable multiple antenna elements to be provided by the overlay, with differing resonant frequencies, effective frequency ranges, input impedances and the like.

Turning to FIG. 6b, the location at which the shorting pin 649 contacts the overlay 640 can result in a portion of the part 641 extending beyond the location at which the shorting pin 649 contacts it. More specifically, the part 641 can extend beyond the location at which the shorting pin 649 contacts it by a distance of 671, which distance can create a second monopole antenna element within the overlay 640. For example, the distance 671 can be selected in accordance with a desired resonant frequency, or utilizable frequency range, for one antenna element in the form of the portion of the part 641 that extends past the shorting pin 649, as indicated by the distance 671. The distance 652 can then remain separately selectable in accordance with a second desired resonant frequency, or second utilizable frequency range, for a second, different antenna element in the form of the part 642. In such a manner, the overlay 640 can be shaped, arranged and/or manufactured to provide antenna elements having multiple resonant frequencies, frequency ranges, input impedances, and other like design-selectable parameters.

According to one aspect, temple tips, such as the exemplary tip 136, of the temple 130, can be flexible. More specifically, the comfort of wearing glasses can be dependent upon a distance beyond the wearer's head that the tips of the temples of such glasses extend. To accommodate multiple different head sizes, flexible tips can be utilized, which can be bent inward, such as is illustrated by the bend action 680, to increase the comfort in instances where glasses wearers with smaller heads have the temples extend to far beyond their ears. To accommodate flexibility in some region of the temple 130, the overlay 640 can be constructed of flexible metal. Additionally, the method of manufacturing the overlay 640, along the region 639 of the temple 130, can take into account such flexibility. For example, the overlay 640 can be laser deposited onto the region 639, such as in a designed shape or arrangement. As another example, the overlay 640 can be etched onto the substrate. As yet another example, the overlay 640 can be generated by removing portions of a metallic overlay so as to expose the underlying substrate in those areas that are not part of the overlay 640.

Because the overlay 640 can be on an outward-facing side 131 of the temple 130, while the overlay 240, such as shown in FIG. 2, can be on an inward-facing side 133 of the temple 130, the overlay 640 and the overlay 240 can be constructed on to a same temple, providing such a temple with both the antenna capabilities described above with reference to FIG. 2, as well as the antenna capabilities described above with reference to FIGS. 6a-b. To increase aesthetics, a coating or other visual covering can be applied over the structures described to generate a uniform appearance. Such a coating, or other covering, can be selected so as to minimize any negative impact on the antenna capabilities. Alternatively, or in addition, the overlay 640 and the overlay 240 can be constructed on a same side of the temple, namely the inward-facing side, thereby providing a uniform appearance when worn without utilizing coatings.

The head of a wearer of smart glasses can negatively impact antenna reception and transmission in the direction of the head. Accordingly, according to one aspect, both temples of smart glasses can be constructed with the same set of one or more antenna structures, such as those detailed above. According to an alternative aspect, however, each temple of smart glasses can comprise unique antenna structures, in accordance with the mechanisms detailed above. In such a manner, metallic structures on the temples of smart glasses can be utilized to provide both mechanical functionality, such as structural stability and/or thermal dissipation capability, as well as communicational functionality, by providing antenna grounds and/or antenna elements.

The descriptions above include, as a first example a temple for eyeglasses, the temple comprising: a first end at which the temple is connectable to the eyeglasses, the temple extending away from the first end and terminating at a temple tip opposite the first end; a substrate extending from the first end towards the temple tip, the substrate being electrically insulating; a first overlay over the substrate along a first region of the temple, the first overlay being electrically conductive; a second overlay over the substrate along a second region of the temple, the second overlay also being electrically conductive, the second region being immediately adjacent to the first region such that a first side of the second overlay contacts a first side of the first overlay, the first side of the second overlay extending along only a portion of the first side of the first overlay, the second overlay having a second side opposite the first side, and third and fourth sides adjacent to the first and second sides, the substrate being exposed along the second, third and fourth sides of the second overlay; and a first antenna comprising a first antenna ground and a first antenna element, the first overlay being the first antenna ground and the second overlay being the first antenna element.

A second example is the temple of the first example, wherein the first antenna is a quarter wavelength monopole antenna, a length of the third and fourth sides of the second overlay establishing the quarter wavelength.

A third example is the temple of the first example, wherein the first overlay encircles the substrate along the first region of the temple.

A fourth example is the temple of the first example, wherein the second overlay comprises an electrical connection at a first location on the second overlay, a positioning of the first location on the second overlay relative to the first side of the second overlay determining an input impedance of the first antenna when provided with an input signal at the electrical connection.

A fifth example is the temple of the first example, wherein the first overlay is more proximate to the temple tip than the second overlay.

A sixth example is the temple of the first example, further comprising: a third overlay over the substrate along at least some of the second region, the third overlay having a first side that contacts the first overlay, a second side opposite the first side, and third and fourth sides adjacent to the first and second sides, the substrate being exposed along the second, third and fourth sides of the third overlay; and a second antenna comprising a second antenna ground and a second antenna element, the first overlay being the second antenna ground and the third overlay being the second antenna element.

A seventh example is the temple of the sixth example, wherein the first side of the third overlay contacts the first overlay along the first side of the first overlay.

An eighth example is the temple of the first example, wherein the second overlay is on an inward-facing side of the temple that is adjacent to a head of a person wearing the eyeglasses.

A ninth example is the temple of the first example, further comprising: a third overlay over the substrate along a third region of the temple, the third overlay also being electrically conductive, the third region being spaced apart from the first region; a fourth overlay having a first end coupled to the substrate and a second end coupled to the third overlay at a first location on the third overlay; and a second antenna comprising a second antenna ground and a second antenna element, the first overlay being the second antenna ground and the third overlay being the second antenna element.

A tenth example is a temple for eyeglasses, the temple comprising: a first end at which the temple is connectable to the eyeglasses, the temple extending away from the first end and terminating at a temple tip opposite the first end; a substrate extending from the first end towards the temple tip, the substrate being electrically insulating; a first overlay over the substrate along a first region of the temple, the first overlay being electrically conductive; a second overlay over the substrate along a second region of the temple, the second overlay also being electrically conductive, the second region being spaced apart from the first region; a third overlay having a first end coupled to the substrate and a second end coupled to the second overlay at a first location on the second overlay; and a first antenna comprising a first antenna ground and a first antenna element, the first overlay being the first antenna ground and the second overlay being the first antenna element.

An eleventh example is the temple of the tenth example, wherein the first antenna is a folded antenna, the third overlay being a shorting pin.

A twelfth example is the temple of the tenth example, wherein the first overlay encircles the substrate along the first region of the temple.

A thirteenth example is the temple of the tenth example, wherein the second overlay comprises an electrical connection at a second location on the second overlay, a positioning of the second location on the second overlay relative to the first location on the second overlay determining an input impedance of the first antenna when provided with an input signal at the electrical connection.

A fourteenth example is the temple of the tenth example, wherein the first overlay is more proximate to the temple tip than the second overlay.

A fifteenth example is the temple of the tenth example, wherein the second overlay comprises a first part and a second part extending along a portion of the first part, the first and second parts being spaced apart, the second overlay further comprising a third part that electrically couples the first and second part.

A sixteenth example is the temple of the fifteenth example, wherein the first location on the second overlay is on the second part of the second overlay, the third part of the second overlay comprising a communicational coupling to the first antenna.

A seventeenth example is the temple of the tenth example, wherein the second and third overlays are on an outward-facing side of the temple that is opposite an inward-facing side of the temple, the inward-facing side being adjacent to a head of a person wearing the eyeglasses.

An eighteenth example is the temple of the tenth example, further comprising: a third overlay over the substrate along a third region of the temple, the third overlay also being electrically conductive, the third region being immediately adjacent to the first region such that a first side of the third overlay contacts a first side of the first overlay, the first side of the third overlay extending along only a portion of the first side of the first overlay, the third overlay having a second side opposite the first side, and third and fourth sides adjacent to the first and second sides, the substrate being exposed along the second, third and fourth sides of the third overlay; and a second antenna comprising a second antenna ground and a second antenna element, the first overlay being the second antenna ground and the third overlay being the second antenna element.

A nineteenth example is a temple for eyeglasses made from a process comprising: obtaining the temple, the temple comprising: a first end at which the temple is connectable to the eyeglasses, the temple extending away from the first end and terminating at a temple tip opposite the first end; a substrate extending from the first end towards the temple tip, the substrate being electrically insulating; and an overlay over the substrate along a first region of the temple, the overlay being electrically conductive; and removing portions of the overlay to leave: a first remaining portion of the overlay over the substrate along a second region of the temple; and a second remaining portion of the overlay over the substrate along a third region of the temple, the third region being immediately adjacent to the second region such that a first side of the second remaining portion of the overlay contacts a first side of the first remaining portion of the overlay, the first side of the second remaining portion of the overlay extending along only a portion of the first side of the first remaining portion of the overlay, the second remaining portion of the overlay having a second side opposite the first side, and third and fourth sides adjacent to the first and second sides, wherein the removing the portions of the overlay leaving the substrate exposed along the second, third and fourth sides of the second remaining portion of the overlay; wherein, after the removing the portions of the overlay, the temple comprises a first antenna comprising a first antenna ground and a first antenna element, the first remaining portion of the overlay being the first antenna ground and the second remaining portion of the overlay being the first antenna element.

A twentieth example is the temple of the nineteenth example, wherein the process further comprises: deposit a first electrically conductive material onto the substrate along a second region of the temple, the first electrically conductive material being positioned to be spaced apart from the first and second remaining portions of the overlay; and electrically coupling the electrically conductive material to the first remaining portion of the overlay at a first location on the deposited first electrically conductive material; wherein, after depositing the first electrically conductive material onto the substrate, the temple further comprises a second antenna comprising a second antenna ground and a second antenna element, the first remaining portion of the overlay being the second antenna ground and the applied first electrically conductive flex being the second antenna element.

As can be seen from the above descriptions, an antenna design and manufacturing for smart glasses antennas has been presented. In view of the many possible variations of the subject matter described herein, we claim as our invention all such embodiments as may come within the scope of the following claims and equivalents thereto.

We claim:

1. A temple for eyeglasses, the temple comprising:
   a first end at which the temple is connectable to the eyeglasses, the temple extending away from the first end and terminating at a temple tip opposite the first end;
   a substrate extending from the first end towards the temple tip, the substrate being electrically insulating;
   a first overlay over the substrate along a first region of the temple, the first overlay being electrically conductive, wherein the first overlay at least partially encircles the substrate along two or more outer side surfaces of the first region of the temple;
   a second overlay over the substrate along a second region of the temple, the second overlay also being electrically conductive, the second region being immediately adjacent to the first region such that a first side of the second overlay contacts a first side of the first overlay, the first side of the second overlay extending along only a portion of the first side of the first overlay, the second overlay having a second side opposite the first side, and third and fourth sides adjacent to the first side and the second side of the second overlay, the substrate being exposed along the second, third and fourth sides of the second overlay; and
   a first antenna comprising a first antenna ground and a first antenna element, the first overlay being the first antenna ground and the second overlay being the first antenna element.

2. The temple of claim 1, wherein the first antenna is a quarter wavelength monopole antenna, a length of the third and fourth sides of the second overlay establishing the quarter wavelength.

3. The temple of claim 1, wherein the second overlay comprises an electrical connection at a first location on the second overlay, a positioning of the first location on the second overlay relative to the first side of the second overlay determining an input impedance of the first antenna when provided with an input signal at the electrical connection.

4. The temple of claim 1, wherein the first overlay is more proximate to the temple tip than the second overlay.

5. The temple of claim 1, further comprising:
   a third overlay over the substrate along at least some of the second region, the third overlay having a first side that contacts the first overlay, a second side opposite the first side, and third and fourth sides adjacent to the first side and the second side of the third overlay, the substrate being exposed along the second, third and fourth sides of the third overlay; and
   a second antenna comprising a second antenna ground and a second antenna element, the first overlay being the second antenna ground and the third overlay being the second antenna element.

6. The temple of claim 5, wherein the first side of the third overlay contacts the first overlay along the first side of the first overlay.

7. The temple of claim 1, wherein the second overlay is on an inward-facing side of the temple that is adjacent to a head of a person wearing the eyeglasses.

8. The temple of claim 1, further comprising:
   a third overlay over the substrate along a third region of the temple, the third overlay also being electrically conductive, the third region being spaced apart from the first region;
   a fourth overlay having a first end coupled to the substrate and a second end coupled to the third overlay at a first location on the third overlay; and
   a second antenna comprising a second antenna ground and a second antenna element, the first overlay being the second antenna ground and the third overlay being the second antenna element.

9. A temple for eyeglasses, the temple comprising:
   a first end at which the temple is connectable to the eyeglasses, the temple extending away from the first end and terminating at a temple tip opposite the first end;
   a substrate extending from the first end towards the temple tip, the substrate being electrically insulating;
   a first overlay over the substrate along a first region of the temple, the first overlay being electrically conductive, wherein the first overlay at least partially encircles the substrate along two or more outer side surfaces of the first region of the temple;
   a second overlay over the substrate along a second region of the temple, the second overlay also being electrically conductive, the second region being spaced apart from the first region;
   a third overlay having a first end coupled to the first overlay and a second end coupled to the second overlay at a first location on the second overlay; and
   a first antenna comprising a first antenna ground and a first antenna element, the first overlay being the first antenna ground and the second overlay being the first antenna element.

10. The temple of claim 9, wherein the first antenna is a folded antenna, the third overlay being a shorting pin.

11. The temple of claim 9, wherein the second overlay comprises an electrical connection at a second location on the second overlay, a positioning of the second location on the second overlay relative to the first location on the second overlay determining an input impedance of the first antenna when provided with an input signal at the electrical connection.

12. The temple of claim 9, wherein the first overlay is more proximate to the temple tip than the second overlay.

13. The temple of claim 9, wherein the second overlay comprises a first part and a second part extending along a portion of the first part, the first part and the second part being spaced apart, the second overlay further comprising a third part that electrically couples the first part and the second part.

14. The temple of claim 13, wherein the first location on the second overlay is on the second part of the second overlay, the third part of the second overlay comprising a communicational coupling to the first antenna.

15. The temple of claim 9, wherein the second and third overlays are on an outward-facing side of the temple that is opposite an inward-facing side of the temple, the inward-facing side being adjacent to a head of a person wearing the eyeglasses.

16. The temple of claim 9, further comprising:
   A fourth overlay over the substrate along a third region of the temple, the fourth overlay also being electrically conductive, the third region being immediately adjacent to the first region such that a first side of the fourth overlay contacts a first side of the first overlay, the first side of the fourth overlay extending along only a portion of the first side of the first overlay, the fourth overlay having a second side opposite the first side, and third and fourth sides adjacent to the first side and the second side of the fourth overlay, the substrate being exposed along the second, third and fourth sides of the fourth overlay; and a second antenna comprising a second antenna ground and a second antenna element, the first overlay being the second antenna ground and the fourth overlay being the second antenna element.

17. A temple for eyeglasses made from a process comprising:
  obtaining the temple, the temple comprising:
    a first end at which the temple is connectable to the eyeglasses, the temple extending away from the first end and terminating at a temple tip opposite the first end;
    a substrate extending from the first end towards the temple tip, the substrate being electrically insulating; and
    an overlay over the substrate along a first region of the temple, the overlay being electrically conductive, wherein the overlay at least partially encircles the substrate along two or more outer side surfaces of the first region of the temple; and
  removing portions of the overlay to leave:
    a first remaining portion of the overlay over the substrate along a second region of the temple; and
    a second remaining portion of the overlay over the substrate along a third region of the temple, the third region being immediately adjacent to the second region such that a first side of the second remaining portion of the overlay contacts a first side of the first remaining portion of the overlay, the first side of the second remaining portion of the overlay extending along only a portion of the first side of the first remaining portion of the overlay, the second remaining portion of the overlay having a second side opposite the first side, and third and fourth sides adjacent to the first side and the second side of the second remaining portion, wherein the removing the portions of the overlay leaving the substrate exposed along the second, third and fourth sides of the second remaining portion of the overlay;
    wherein, after the removing the portions of the overlay, the temple comprises a first antenna comprising a first antenna ground and a first antenna element, the first remaining portion of the overlay being the first antenna ground and the second remaining portion of the overlay being the first antenna element.

18. The temple of claim 17, wherein the process further comprises:
  deposit a first electrically conductive material onto the substrate along the second region of the temple, the first electrically conductive material being positioned to be spaced apart from the first remaining portion and the second remaining portions portion of the overlay; and
  electrically coupling the electrically conductive material to the first remaining portion of the overlay at a first location on the first electrically conductive material;
  wherein, after depositing the first electrically conductive material onto the substrate, the temple further comprises a second antenna comprising a second antenna ground and a second antenna element, the first remaining portion of the overlay being the second antenna ground and the first electrically conductive material being the second antenna element.

\* \* \* \* \*